United States Patent Office 3,497,565
Patented Feb. 24, 1970

3,497,565
PROCESS FOR THE PREPARATION OF
POLYHALOGENATED ALKENES
Pierre Legendre, Pau, France, assignor to Societe
Nationale des Petroles d'Aquitaine, Courbevoie,
France
No Drawing. Filed Aug. 4, 1967, Ser. No. 658,347
Claims priority, application France, Aug. 10, 1966,
72,771
Int. Cl. C07c 17/00
U.S. Cl. 260—654                                    6 Claims

ABSTRACT OF THE DISCLOSURE

The present invention concerns a process for the preparation of polyhalogenated alkenes, which consists in treating with a halogen, a bis-, mono- or poly-haloalkenyl sulphide, in which there is at least one halogen atom in the 1-position with respect to the double bond of the alkenyl group.

---

The present invention relates to a new process for the preparation of polyhalogenated alkenes, more particularly di-, tri-, tetra- and penta-halogenated alkenes. It is concerned particularly with the preparation of tri-, tetra- and penta-halogenated propenes, including such compounds in which the 2-carbon may possibly be substituted, such as with alkyl groups for example. The invention is especially concerned with the preparation of 1,3,3,3-tetrachloro-1-propene, 1,1,3,3-tetrachloro-1-propene and 1,1,3,3,3-pentachloro-1-propene.

Various halogenated compounds which are derivatives of aliphatic hydrocarbons are of interest industrially; as regards the compounds indicated above which do not carry halogen on the middle carbon, there has not so far existed an industrial method permitting them to be prepared in an economic manner, except for 1,3,3,3-tetrachloro-propene and 1,1,3,3-tetrachloro-propene.

The present invention fills this gap: it enables a whole range of compounds, and particularly the penta-halogenated derivatives, to be manufactured in a very economic manner, starting from an initial material which is readily available.

The new process according to the invention consists in treating with halogen, a bis-(mono- or polyhalo-alkenyl) sulphide in which there is at least one halogen atom in the 1-position with respect to the double bond of the alkenyl group.

The proportion of halogen is preferably at least stoichiometric.

The haloalkenyl sulphides which can be used for carrying out the invention may be represented by the general formula:

(1)

in which X is a halogen atom, Y and Z may be the same or different and are each a halogen or hydrogen atom or an alkyl group and Q is a halogen or hydrogen atom; in these compounds, the halogen can be F, Cl, Br or I, and more particularly chlorine or bromine, chlorine giving rise to the most economic products; as regards the alkyl groups, they preferably have from 1 to 6 carbon atoms.

The invention is based on the unexpected discovery that one or more halogen atoms can be introduced into each of the 2-alkenyl groups of a dialkenyl sulphide, with splitting of the molecule into sulphur halide and a polyhalo-alkene or alkenes provided that the alkenyl groups of the sulphide being used already contain at least one halogen atom in the 1-position with respect to the double bond.

Thus, during the research which has resulted in the present invention, it was for example found that the sulphide $(CH_2=CCl-CH_2)_2S$, when treated with chlorine, leads to tars, without the formation of dichloropropene, trichloropropene or tetrachloropropene. On the other hand, if this sulphide is replaced by its isomer $$(HCCl=CH-CH_2)_2S$$

in which Cl is in the 1-position, instead of in the 2-position, the action of the chlorine permits of obtaining about 35% of dichloropropene $CHCl=CH-CH_2Cl$ and about 60% of trichloropropene $CHCl=CH-CHCl_2$, together with tars and a little $CCl_2=CH-CHCl_2$.

The treatment with the halogen can be carried out on the bis-(haloalkenyl)sulphide as such, or else on the sulphide in solution in an appropriate inert solvent. Solvents such as ether or carbon tetrachloride or other chlorinated aliphatic hydrocarbon can be used with advantage.

The preparation can be carried out over a wide temperature range, namely between −30° C. and +100° C. and particularly between 0 and 60° C. In the particular case where it is desired to prepare substantial proportions of penta-halogenated derivatives, starting with a dihaloalkenyl sulphide, the best yields are obtained between 20 and 40° C. If it is desired to obtain substantial proportions of tri-halogenated derivatives, it is preferable to work in the temperature range from −30 to 0° C.

The new process makes it possible for predominant proportions of 1,3,3,3- and 1,1,3,3-tetrahalo-1-propenes to be obtained, which may possibly be substituted at the 2-position with other substituents; it is easy to separate these compounds by distillation, under reduced pressure, from other derivatives which are formed, and in particular from the penta-halogenated and tri-halogenated derivatives.

As the starting material for the process according to the invention, it is possible to employ known alkenyl sulphides such as, more particularly, bis-(1,1-dichloro-propene)sulphide. Certain polyhaloalkenes, which are difficult to obtain by other methods, especially those in which the halogen substituents are in the 1,3, the 1,2,3, the 1,2,3,3, the 1,2,3,3,3, the 1,1,2,3, or even the 1,1,2,3,3-positions, can be prepared by the process according to the invention, starting from new hitherto unknown sulphide starting materials; these are in particular the sulphides:

$$(CHCl=CCl-CH_2)_2S \qquad (2)$$

and $$(CCl_2=CCl-CH_2)_2S \qquad (3)$$

These haloalkenyl sulphides can be produced by the action of an alkali metal sulphide on the corresponding haloalkenes containing one more halogen atom in the 3-position. Thus, the bis-(1,1-dihalo-propenyl)-sulphides, which may optionally be substituted at the 2-position, can easily be obtained by a process which consists in causing an alkali metal monosulphide to react with a 1,1,3- or 3,3,3-trihalo-1-propene, in accordance with the reaction:

$$2CCl_2=CHCH_2Cl+Na_2S$$

or $\rightarrow CCl_2=CHCH_2-S-CH_2CH=CCl_2+2NaCl$ $$2CH_2=CHCCl_3+Na_2S$$

Bis-(1,1-dichloro-1-propenyl)sulphide has a boiling point of 100° C. at 2 mm. Hg and a refractive index $n_D^{20}$ of 1.5628.

It is possible to prepare in a similar manner, bis-(1,1-dichloro - 2 - methyl - 1 - propenyl)sulphide for example, or other homologues such as the fluorinated, brominated, chlorofluronated, bromofluorinated or chlorobrominated compounds.

The sulphide can also be prepared by a process which consists in treating a 1,1,1,3-tetrahalopropane simultaneously with an alkali metal sulphide and with a base, according to, for example, the reaction:

$$CCl_3CH_2CH_2Cl + Na_2^6 + 2NaOH \rightarrow$$
$$CCl_2=CHCH_2-S-CH_2CH=CCl_2 + 4NaCl$$

In the particular case of the preparation of the tetrachloroprepenes and of 1,1,3,3,3-pentachloro-1-propene, the chlorination of the corresponding chloropropenyl sulphide takes place in proportions equal or close to stoichiometric, namely 4 mols of chlorine per mol of sulphide, in accordance with the theoretical reaction:

$$CCl_2=CHCH_2-S-CH_2CH=CCl_2 + 4Cl_2 \rightarrow$$
$$2CCl_3CH=CCl_2 + SCl_2 + 2HCl$$

However, in actual fact, there is formation of some 1,1,3,3,3 and 1,2,3,3,3-pentachloro-1-propene and of a small quantity of 1,1,3-trichloro-1-propene, as well as a small proportion of products heavier than 1,1,3,3,3-pentachloro-1-propene. However, as indicated above, it is easy for the various useful compounds which are formed to be separated by distillation.

In general terms, the process according to the invention can be carried into effect with a proportion of halogen of 1 to 1.5 times the quantity which is theoretically required for the formation of the desired polyhalogenated alkene.

The invention is illustrated by the following non-limiting examples.

EXAMPLES 1 TO 5

Into a spherical flask containing 252 g. (1 mol) of bis-(1,1-dichloro-1-propenyl)sulphide, of the formula $CCl_2=CH-CH_2-S-CH_2-CH=CCl_2$, which is kept at a predetermined temperature T as indicated in the table, there is introduced 284 g. of anhydrous gaseous chlorine (4 mols). The flask is kept for 2 hours at the temperature in question, after which the residue is subjected to distillation by fractionation under vacuum. 1,1,3-trichloropropene distils over at 50° C./30 mm. Hg, 1,3,3,3-tetrachloropropene at 45–50° C./20 mm. Hg, the 1,1,3,3-isomer at 50–55° C./20 mm. Hg, and 1,1,3,3,3-pentachloro-1-propene between 72 and 77° C./20 mm. Hg.

The refractive indices for the D lines at 20° C. of these 4 derivatives are respectively:

1.492—1.498—1.505—1.525

The pentachloropropene has an infra-red spectrum, characterised by the following lines:

| 3,060 cm.$^{-1}$ | 775 |
| 1,600 | 710 |
| 1,075 | 630 |
| 930 | 590 |
| 815 | | which distinguish it very sharply from its 1,2,3,3,3- and 1,1,2,3,3-isomers.

The following table gives the molar yields of products obtained at different temperatures.

TABLE

| Example No. | Temperature, T.° | Molar yields, percent | | |
|---|---|---|---|---|
| | | 1,1,3-trichloropropene | Tetrachloropropenes | 1,1,3,3,3-pentachloropropene |
| 1 | 20 | 16 | 42.5 | 4.37 |
| 2 | 0 | 8.6 | 42 | 8 |
| 3 | 20 | 6 | 44 | 15.3 |
| 4 | 40 | 7.1 | 41.5 | 15.1 |
| 5 | 60 | 4 | 43 | 17 |

The molar yields are calculated, for each of the compounds produced, with respect to the theoretical yield, according to which 2 mols of halopropene should be obtained per mol of chloropropenyl sulphide used.

The maximum content of 1,3,3,3-tetrachloropene in the mixtures obtained is about 35 to 40%.

It is found that, starting at 0°, the amount of the trichlorinated derivative formed is small, but that it becomes perceptible at low positive temperatures. On the other hand, Examples 1 to 5 show that the yield of the tetrachlorinated derivative is practically independent of the temperature, whereas the yield of the pentachlorinated derivative increases with temperature.

EXAMPLE 6

Example 3 was repeated, with the difference that the chloropropenyl sulphide was used in a 35% by weight solution in CCl₄ at 20°; the molar yield of 1,1,3,3,3-pentachloro-1-propene was 15.8%.

EXAMPLE 7

Into a spherical flask, there was introduced 252 g. (1 mol) of bis-(1,2-dichloro-1-propenyl)sulphide, of the Formula 2 indicated above, and 2500 ml. of carbon tetrachloride, which dissolves the sulphide.

This sulphide, which was hitherto unknown, boils at 114° C./1 mm. Hg; in its infra-red spectrum, there are found inter alia the characteristic lines of 3080, 1610, 1230, 1090, 910 and 630 cm.⁻¹.

284 g. of gaseous chlorine (4 moles) is caused to pass into the solution which is obtained, at ambient temperature.

After 2 hours, the contents of the flask are subjected to fractional distillation, the solvent and the SCl₂ formed having first of all been eliminated.

The halopropene which is obtained contains about 40% of 1,2,3-trichloro-1-propene $CHCl=CCl-CH_2Cl$, about 50% of 1,2,3,3-tetrachloro-1-propene $$CHCl=CCl-CHCl_2,$$

and about 10% of 1,1,2,3,3-pentachloro-1-propene.

EXAMPLE 8

The sulphide subjected to the action of chlorine is the hitherto unknown bis-(1,1,2-trichloro-1-propenyl)sulphide corresponding to the Formula 3 indicated above. This substance boils at 125° C./1 mm. Hg and has the characteristic lines of 2990, 2890, 1600, 1240, 1120, 900 and 860 cm.⁻¹, inter alia, in its infra-red spectrum. 321 g. of this sulphide (1 mol) is dissolved in 1500 ml. of CCl₄ and treated with 284 g. of chlorine, as in Example 7. The chlorinated alkenes thus obtained comprise mainly 1,2,3,3,3-pentachloro-1-propene, in a quantity of about 70%, a small proportion of the order of 10% of 1,1,2,3-tetrachloro-1-propene and about 20% of 1,1,2,3,3,3-hexachloro-1-propene; this latter compound (C₃Cl₆) is easily separated by distillation; its boiling point being 75° C./2 mm. Hg.

What we claim is:

1. A process for the preparation of polyhalogenated alkenes, which comprises treating a bis-mono- or poly-(chloropropenyl)sulphide containing chlorine atoms as the only substituents other than hydrogen, in which there is at least one chloro-substituent in the 1-position with respect to the double bond of the propenyl group and no chloro-substituents on carbon atom 3 of the carbon chain, with chlorine, the chlorine being reacted in an amount of from 1 to 1.5 times that equivalent to the stoichiometric ratio and at temperatures of from −30° to 100° C., to form the corresponding polychlorinated propenes.

2. A process according to claim 1 characterised in that the said sulphide has the formula $$(X-\underset{Z}{C}=\underset{Y}{C}-CH_2)_2S$$

in which X is a halogen atom; Y and Z may be the same or different and are each a chloro or hydrogen atom.

3. A process according to claim 1, characterised in that 1 mol of bis-(1,1-dichloro-1-propenyl)sulphide is treated with 4 mols of chlorine at a temperature between 0 and 60° C., 1,3,3,3-tetrachloro-1-propene, 1,1,3,3-tetrachloro-1-propene and 1,1,3,3,3-pentachloro-1-propene being obtained.

4. A process according to claim 1 characterised in that one mol of bis-(1,1-dichloro-1-propenyl)sulphide is treated with 4 mols of chlorine at a temperature between −30° C. and 0° C., 1,1,3-trichloro-1-propene being obtained.

5. A process according to claim 1, characterised in that the sulphide used is bis-1,2-dichloro-1-propenyl) sulphide.

6. A process according to claim 1 characterised in that the sulphide used is bis-(1,1,2-trichloro-1-propenyl)sulphide.

References Cited

UNITED STATES PATENTS 2,490,424   12/1949   Ferguson.

BERNARD HELFIN, Primary Examiner

J. BOSKA, Assistant Examiner